Jan. 22, 1957 F. BRAUN 2,778,513
LOADING APPARATUS
Filed March 15, 1954 4 Sheets-Sheet 2
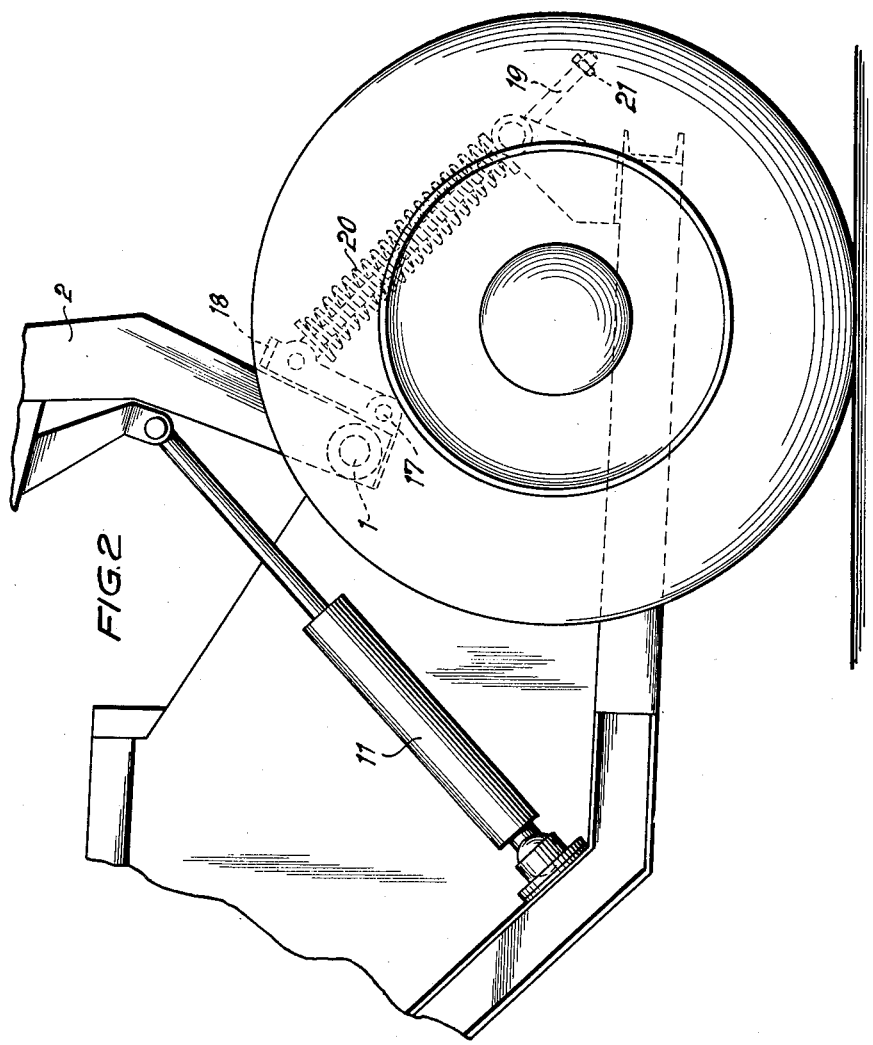
INVENTOR
FRANZ BRAUN
BY:

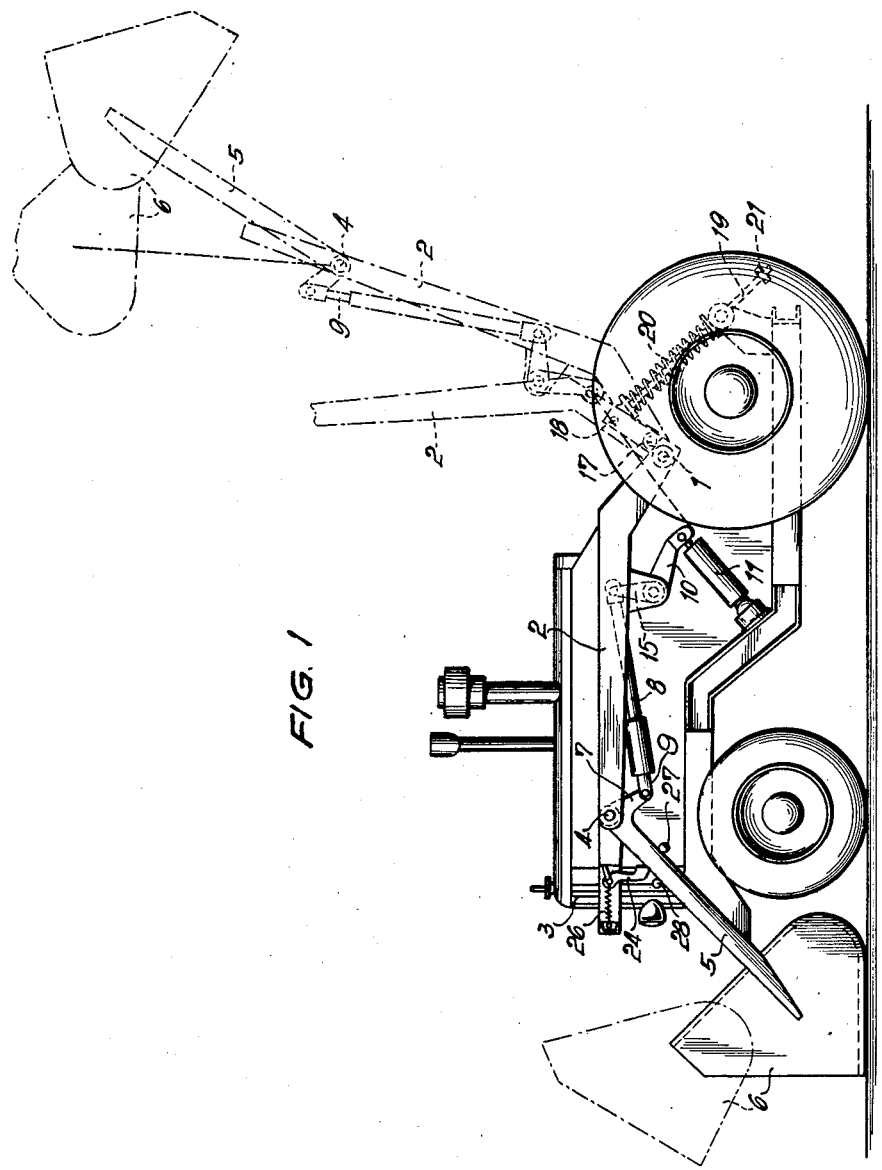

Jan. 22, 1957　　　　　F. BRAUN　　　　　2,778,513
LOADING APPARATUS
Filed March 15, 1954　　　　　　　　　　4 Sheets-Sheet 3
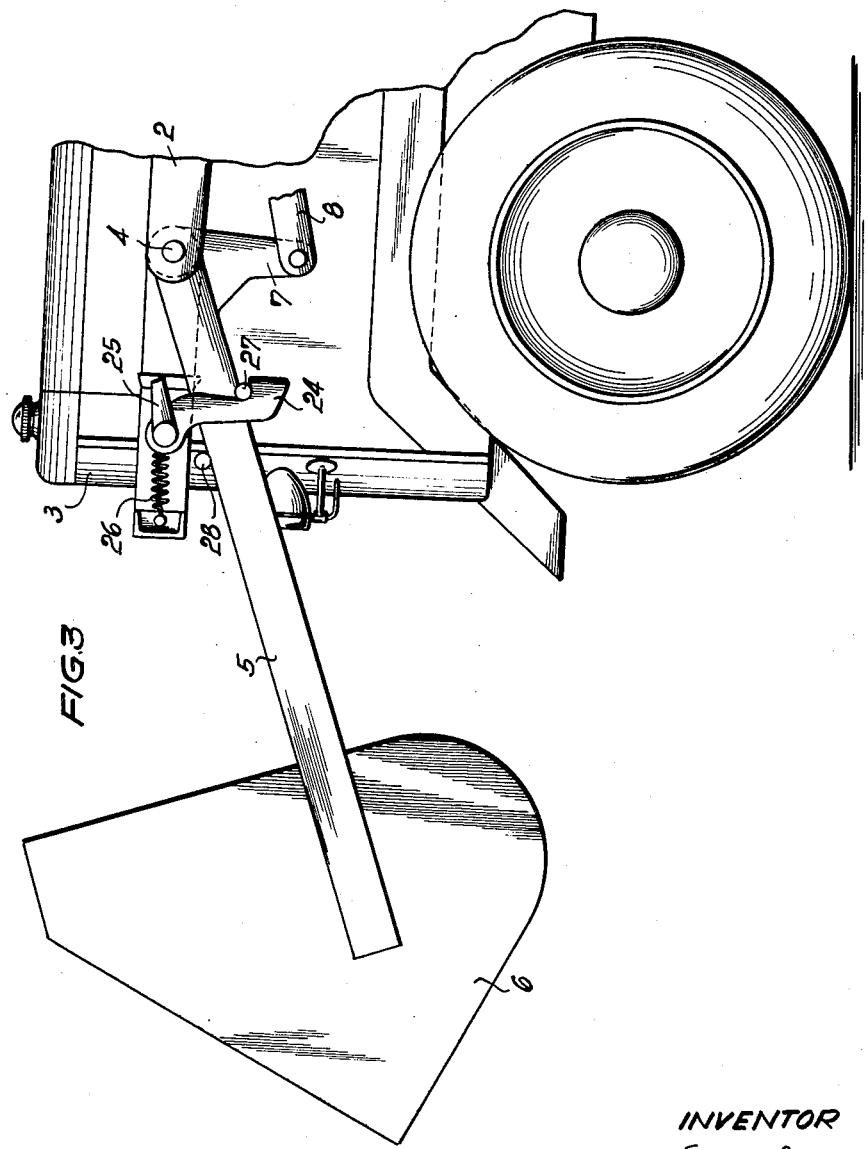
INVENTOR
FRANZ BRAUN
BY:

Jan. 22, 1957 F. BRAUN 2,778,513
LOADING APPARATUS
Filed March 15, 1954 4 Sheets-Sheet 4
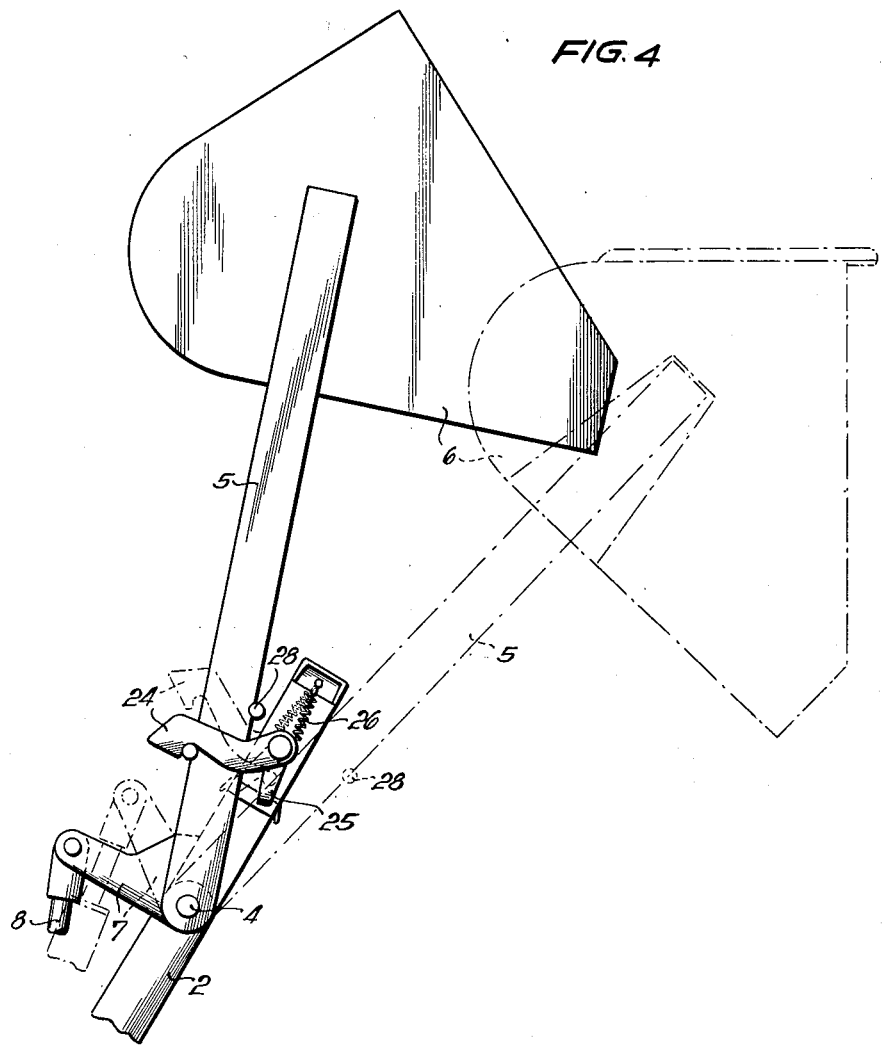
INVENTOR
FRANZ BRAUN
BY:

United States Patent Office 2,778,513
Patented Jan. 22, 1957

2,778,513
LOADING APPARATUS

Franz Braun, Munich, Germany, assignor to F. X. Meiller, Fahrzeug- und Maschinenfabrik, Munich, Germany Application March 15, 1954, Serial No. 416,330

Claims priority, application Germany March 14, 1953

7 Claims. (Cl. 214—131)

The present invention relates to loading apparatus and more particularly to that type of apparatus wherein a load carrying means is moved together with a load upwardly and rearwardly through the medium of a turning beam to a load deliverying position where the load is delivered from the load carrying means.

Structures of this type include the disadvantage of requiring several control structures to produce the desired operations. For example, where a tractor is provided with such a turnable beam carrying a bucket at its outer end, it is necessary for the tractor operator to manipulate one set of controls and one moving means for turning the beam and an entirely distinctive set of controls and moving means for turning the bucket with respect to the beam so that the bucket may properly receive and carry the load and may properly be tilted to drop the load after the beam has been turned to position the bucket at a load delivery position. One of the objects of the present invention is to overcome the above drawbacks by providing a loading apparatus which with one set of controls and moving means is capable of performing the results which formerly required at least two sets of controls and moving means, as described above.

Another object of the present invention is to provide a loading apparatus with a means for automatically delivering a load therefrom when the loading apparatus has reached a predetermined position.

A further object of the present invention is to provide a means for moving a loading apparatus between load receiving and load delivering positions with a minimum amount of power.

An additional object of the present invention is to provide a means for automatically locking a load carrying structure to a load moving structure after the load carrying structure has been moved through a predetermined distance with respect to the load moving structure and for automatically releasing the load carrying structure from the load moving structure after the load has been delivered.

Also, the objects of the present invention include the provision of a structure capable of accomplishing all of the above objects and at the same time being made up of a relatively small number of simple and ruggedly constructed parts which are inexpensive to manufacture and which are very reliable in operation.

With the above objects in view, the present invention mainly consists of a loading apparatus which includes a support means and a first arm carried by the support means for turning movement from a load receiving position to a load delivering position. A second arm is turnably carried by the first arm for movement with the same between said positions and for turning movement with respect to the first arm. A load carrying means, on which a load is adapted to rest by gravity, is fixed to the second arm, and a lost motion means is connected to the first and second arms for limiting the extent of free turning movement of the second arm with respect to the first arm.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a side elevational view of an embodiment of the present invention;

Fig. 2 is a fragmentary elevational view, on an enlarged scale, of the structure shown at the right hand portion of Fig. 1;

Fig. 3 is a fragmentary side elevational view, on an enlarged scale, of the structure shown at the left hand portion of Fig. 1 in a different position from that shown in Fig. 1; and Fig. 4 is a side elevational view on an enlarged scale of the structure of Fig. 3 in a different position thereof.

Referring now to the drawings, there is shown in Fig. 1 a tractor having an arm 2 mounted thereon for turning movement about the pivot 1. This arm 2 is substantially U-shaped and extends around the radiator 3 of the tractor and along the opposite sides thereof rearwardly to the pivot 1. The arm 2 is provided on each side of the tractor with a pivot 4 one of which is shown in Fig. 1, and these pivots 4 serve to pivotally mount arms 5 on the arm 2, one of these arms 5 being shown in Fig. 1. The arms 5 are aligned with each other and a load carrying means in the form of a bucket 6 is rigidly fixed between and to the outer ends of the arms 5 so that the bucket 6 turns together with the arms 5. Each arm 5 is in the form of a bellcrank lever having an arm 7 to which a lost motion means is connected. In the example shown in Fig. 1 the lost motion means is in the form of a tube 8 and a rod 9, pivotally connected to arm 7 and sliding within the tube 8. The rod 9 is movable into the tube 8 to the end position shown in solid lines in Fig. 1 and is movable out of tube 8 to the end position shown in dot-dash lines in Fig. 1. For example, the left end of tube 8, as viewed in Fig. 1, may be provided with an inwardly extending flange against which an enlargement on the inner free end of rod 9 abuts when the parts are in the dot-dash line position shown in Fig. 1. The tube 8 is in turn pivotally connected to the arm 15 of a bellcrank lever which is pivotally carried on each side of the arm 2. Each of these latter bellcrank levers includes a second arm 10 which is pivotally connected to a hydraulic moving means 11 mounted on the tractor at opposite sides thereof. Each hydraulic moving means 11 is in the form of a plurality of telescoped tubular members which are movable from the position shown in solid lines in Fig. 1, when a fluid under pressure is removed from the hydraulic moving means, to a position extending along the dot-dash line which passes through the moving means 11 shown in Fig. 1, the moving means 11 being pivotally mounted at its bottom end on the tractor through any suitable ball and socket joint, or the like. The free ends of the arm 2 carry adjacent to the pivot 1 lugs 17, respectively, to which arms 18 are respectively pivoted. An elongated rod 19 is pivotally connected to the free end of each arm 18, and a coil spring 20 is located about each rod 19 and urges the arm 18 in a counterclockwise direction, as viewed in Figs. 1 and 2, away from a bracket, shown in dotted lines at the lower right hand portion of Figs. 1 and 2, through which the rods 19 are slidably movable, these rods 19 each having threadedly mounted thereon a nut 21 for adjusting each spring 20. The adjustment of the nut 21 is such that the arms 18 are positioned to be engaged by the arm 2 shortly before the latter reaches its vertical dead center position.

The above described apparatus operates as follows:

With the structure of Fig. 1 in the solid line position indicated therein, the tractor is driven up to a pile of loose material to drive the bucket 6 into the material so that the bucket is filled with the material. At this point the hydraulic moving means 11 is actuated with the result that the bellcrank lever 15, 10 is turned in a counterclockwise direction, as viewed in Fig. 1, to shift the lost motion means 8, 9 to the left, as viewed in Fig. 1, so as to turn the lever 5, 7 in a clockwise direction, as viewed in Fig. 1, to raise the bucket 6 to the dot-dash line position shown at the left of Fig. 1. Thus, during this part of the operation the arm 2 remains stationary and the arms 5 turn upwardly with respect to the arm 2. This operation continues until the right free end of arms 10 engage the arm 2, as shown in Fig. 1 just above the solid line indication of arm 10. The hydraulic fluid under pressure is continuously supplied to the moving means 11 so that after the arms 10 engage the arm 2 at opposite sides thereof, the arms 5 stop turning with respect to the arm 2 and the latter now turns in a clockwise direction about the pivot 1 from the load receiving position indicated in solid lines in Fig. 1 toward the load delivering position shown in dot-dash lines in Fig. 1, the arms 5 and bucket 6 turning together with the arm 2. Thus, the moving means 11 is required to compress the springs 20 before the apparatus reaches its vertical dead center position, and this is easily done because the load in the bucket 6 has only a small moment arm just before the apparatus reaches its vertical dead center position. Thus, the springs 20 are compressed when the apparatus reaches its load delivering position, and the principal force for this compression is derived from the filled bucket 6 when the latter moves beyond its dead center position and swings towards its end position shown at the extreme right end portion of Fig. 1. When the apparatus reaches a vertical dead center position shown just to the left of the extreme right hand position of bucket 6 indicated in dot-dash lines in Fig. 1, the bucket 6 moves by gravity together with the arms 5 and with respect to the arm 2 in a clockwise direction, as viewed in Fig. 1, within the limits determined by the lost motion connection 8, 9 so that the load automatically drops from the bucket 6 which is now in the extreme right hand position shown in Fig. 1. This latter movement of arms 5 and bucket 6 with respect to arm 2 is fully automatic and is derived from the lost motion connection, so that with the structure of the invention the load is automatically delivered from the bucket and it is unnecessary to provide a pivot mounting for the bucket itself and a control means for tilting the bucket with respect to the arms which carry the same. After the load is delivered, the hydraulic fluid is slowly withdrawn from the moving means 11 so that the latter contracts and as a result of the diminished load on the springs 20 the latter automatically urges the arm 2 and parts carried thereby from the load delivering position shown in dash-dot lines in Fig. 1 to the intermediate position also shown in dash-dot lines to the left side of the load delivering position. From this intermediate position the arm 2 and parts carried thereby fall toward the solid line position of Fig. 1 by gravity, and the hydraulic moving means 11 breaks this return movement but is not required to push the parts back to their load receiving position. It is possible, if desired, to arrange shock absorbing elements such as springs, blocks of rubber, and the like between members 8 and 9. It should be noted that the filling of bucket 6 is assured with the structure of the invention by the turning movement of arms 5 with respect to arm 2 before the latter is turned, while with the known constructions it is necessary to tilt the bucket independently of the arms which carry the same.

It is desirable to provide a means independent of the moving means 11 for holding the arms 5 in the position to which they are raised with respect to the arm 2 before the latter is turned by the moving means 11, so that once this position of arms 5 relative to arm 2 is reached, the entire force of the moving means 11 may be applied to the arm 2 for raising the parts as described above. Figs. 3 and 4 show a construction which produces this result. As may be seen from Figs. 3 and 4, a hook 24 is pivotally mounted on each side of the arm 2 adjacent the front end thereof near to the radiator 3. Each hook 24 carries a projection 25 extending angularly from the hook 24 and connected to one end of a snapover spring 26 which is fastened at its opposite end to the arm 2. With this snapover spring arrangement the hook 24 will be urged in a clockwise or counterclockwise direction about its pivot depending on whether the projection 25 is located below or above a horizontal plane, as viewed in Fig. 3, respectively. Each of the arms 5 is provided with a pair of pins 27 and 28, fixed thereto at opposite side edges thereof, which are spaced from each other in such a way, that when the arms 5 are raised from the position of Fig. 6 to that of Fig. 3 each hook 24 becomes located between a pair of pins 27 and 28 and in the position shown in Fig. 3 the projection 25 is above a horizontal plane so that the spring 26 urges the hook 24 in a counterclockwise direction into engagement with the pin 27 so that the hooks 24 automatically engage the pins 27 at the end of the upward movement of arms 5 with respect to arm 2 so that the arms 5 are thus carried by the arm 2 through the medium of the hooks 24 and it is unnecessary to use the energy of the moving means to hold the arms 5 in this position. The arm 2 carries beside each projection 25 a stop which limits the angular movement of hook 24 so that when the projection 25 is located above a horizontal plane, as viewed in Figs. 1 and 3, the pin 27 will engage the free end of hook 24 during upward movement of each arm 5 with respect to arm 2 to turn each hook 24 slightly against the action of spring 26 until the hooks 24 snap into operative engagement with the pins 27.

The parts remain in this position until the bucket 6 moves by gravity from its vertical dead center position shown in solid lines in Fig. 4 to a dot-dash line position within the limits permitted by the lost motion connection 8, 9. As is clearly evident from Fig. 4, during this movement the pin 27 rides along a camming edge of hook 24 which turns the latter in a clockwise direction, as viewed in Fig. 4, so that the spring 26 snaps over to now urge the hook 24 in a clockwise direction within the limits determined by the stop which engages the projection 25, as shown in dotted lines in Fig. 4. Thus, with the hooks in this position the arms 5 are free to fall down with respect to the arm 2, as the latter returns to its load receiving position, since the hooks 24 are located out of the paths of movement of the pins 27. However, during this movement of arms 5 with respect to arm 2 each pin 28 engages an opposite camming edge of each hook 24 to snap the latter back to the position shown in Figs. 1 and 3 so that the above operations may be repeated. It should be noted that this releasable lock means for releasably locking the arms 5 to the arm 2, in the position where the bucket 6 is raised but the arm 2 has not yet been turned, is of great significance when it is desired to transport the bucket 6 with the tractor to a different position before unloading thereof, since with this arrangement it is possible to thus transport the load without requiring the moving means 11 to hold the load in its raised position. It is apparent that the hooks 24 are in every way automatic and are capable of holding the arms 5 in their raised position with respect to the arm 2 after the fluid pressure in the hydraulic moving means 11 is released. Moreover, these hooks do not in any way retard further clockwise turning of arms 5 with respect to arm 2, as viewed in Figs. 3 and 4, and automatically move out of the way so as not to prevent the return of arms 5 to the solid line position thereof shown in Fig. 1.

It will be understood that each of the elements described above, or two or more together, may also find a useful application in other types of loading apparatus differing from the types described above.

While the invention has been illustrated and described as embodied in a loading apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a loading apparatus, in combination, support means; a first arm carried by said support means for turning movement between a lower load receiving position and an upper load delivering position; a second arm turnably carried by said first arm for movement with the same between said positions and for turning movement with respect to said first arm, said second arm extending downwardly from said first arm when the latter is in said load receiving position and said second arm being located beyond a vertical dead center position when said first arm is in said load delivering position thereof; load carrying means on which a load is adapted to rest by gravity, said load carrying means being fixed to said second arm; linkage means pivotally connected at a pair of spaced portions thereof respectively to said first and second arms for first raising said second arm with respect to said first arm, during movement of said linkage means, to lift a load partly toward said load delivering position and for then raising both said arms in their thus attained relative position together with said load carrying means, said linkage means including a lost motion connection located between said spaced portions of said linkage means for limiting the extent of free turning movement of said second arm with respect to said first arm to determine the end positions of said second arm when said first arm is in said load receiving and load delivering positions thereof, respectively; and moving means connected to said linkage means for moving the latter to thus raise said arms.

2. In a loading apparatus, in combination, support means; a first arm carried by said support means for turning movement from a load receiving position to a load delivering position; a second arm turnably carried by said first arm for movement with the same between said positions and for turning movement with respect to said first arm; load carrying means on which a load is adapted to rest by gravity, said load carrying means being fixed to said second arm; linkage means movably connected to said second arm for movement toward and into engagement with said first arm during raising of said second arm with respect to said first arm by movement of said linkage means and for then raising both said arms in their thus attained relative position together with said load carrying means, said linkage means including a lost motion connection for limiting the extent of free turning movement of said second arm with respect to said first arm; and moving means connected to said linkage means for moving the latter to thus raise said arms.

3. A loading apparatus comprising, in combination, support means; an arm turnably connected to said support means for movement from a lower substantially horizontal position upwardly through a substantially vertical dead center position to a load delivering position and from the latter position back to said lower position; a pair of bell crank levers spaced from each other and each being pivotally connected intermediate its ends to said arm and each having a pair of opposite free end portions, one of said free end portions of one of said levers engaging said arm when said one lever is in a predetermined angular relationship with respect to said arm; a lost motion connection pivotally connected at one end to the other of said free end portions of said one lever and pivotally connected at an opposite end to one of said free end portions of the other of said levers; a load carrying means on which a load is adapted to rest by gravity, said load carrying means being fixed to the other of said free end portions of said other lever; and moving means mounted on said support means and being connected to said one end portion of said one lever for turning the latter into engagement with said arm, to raise said load carrying means with respect to said arm, and for then turning said levers, load carrying means, and lost motion connection with said arm to said load delivering position thereof.

4. A loading apparatus comprising, in combination, support means; an arm turnably connected to said support means for movement from a lower substantially horizontal position upwardly through a substantially vertical dead center position to a load delivering position and from the latter position back to said lower position; a pair of bell crank levers spaced from each other and each being pivotally connected intermediate its ends to said arm and each having a pair of opposite free end portions, one of said free end portions of one of said levers engaging said arm when said one lever is in a predetermined angular relationship with respect to said arm; a lost motion connection pivotally connected at one end to the other of said free end portions of said one lever and pivotally connected at an opposite end to one of said free end portions of the other of said levers; a load carrying means on which a load is adapted to rest by gravity, said load carrying means being fixed to the other of said free end portions of said other lever; moving means mounted on said support means and being connected to said one end portion of said one lever for turning the latter into engagement with said arm, to raise said load carrying means with respect to said arm, and for then turning said levers, load carrying means, and lost motion connection with said arm to said load delivering position thereof; and spring means mounted on said support means for resisting movement of said arm into its load delivering position during a last portion of the movement of said arm toward its load delivering position, so that when the load is delivered from said load carrying means said spring means urges said arm back toward its lower position.

5. In a loading apparatus, in combination, support means; a first arm turnably mounted on said support means for movement from a lower load receiving position upwardly through a substantially vertical dead center position to a load delivering position; a second arm turnably carried by said first arm for movement therewith and for turning movement with respect thereto; lost motion means connected to said second arm for giving the latter a limited extent of free turning movement with respect to said first arm between one end position where said second arm extends downwardly from said first arm when the latter is in said load receiving position and an opposite end position to which said second arm moves by gravity as said first arm approaches said load delivering position thereof; a pair of pins fixed to said second arm at spaced portions thereof, respectively; moving means connected to said lost motion means for first raising said second arm to a predetermined position with respect to said first arm and for then moving said first and second arms together between said load receiving and load delivering positions of said second arm; a hook turnably mounted on said first arm, located between said pins when said second arm is in said predetermined position thereof, and having a pair of opposite camming edges respectively directed toward said pins when said second arm is in said predetermined position thereof; and snap over spring means operatively connected to said hook for urging the latter into engagement with one of said pins when said second arm is in said predetermined position thereof and for urging said hook toward the other of said pins after said hook has been moved through the dead center position of said snapover spring means by engagement of said one pin with one of said camming edges during movement of said second arm to said opposite end position thereof, so that during movement of said second arm back to said one end position thereof said other pin engages the other of said camming edges of said hook to move the latter back through the dead center position of said snapover spring means.

6. In a loading apparatus, in combination, support means; a first arm carried by said support means for turning movement from a load receiving position to a load delivering position; a second arm turnably carried by said first arm for movement with the same between said positions and for turning movement with respect to said first arm; load carrying means on which a load is adapted to rest by gravity, said load carrying means being fixed to said second arm; linkage means connected to said second arm for first raising the latter with respect to said first arm, during movement of said linkage means, to lift a load partly toward said load delivering position and for then raising both said arms in their thus attained relative position together with said load carrying means, said linkage means including a lost motion connection for limiting the extent of free turning movement of said second arm with respect to said first arm; and hydraulic moving means connected to said linkage means for moving the latter to thus raise said arms.

7. In a loading apparatus, in combination, support means; a first arm carried by said support means for turning movement between a lower load receiving position and an upper load delivering position; a second arm turnably carried by said first arm for movement with the same between said positions and for turning movement with respect to said first arm, said second arm extending downwardly from said first arm when the latter is in said load receiving position and said second arm being located beyond a vertical dead-center position when said first arm is in said load delivering position thereof; a load carrying bucket on which the load is adapted to rest by gravity, said load carrying bucket being fixed to said second arm and having an upper wall substantially perpendicular to said second arm when said second arm is in said load receiving position and said upper wall becoming a lower horizontally positioned wall of the bucket when said second arm is in an intermediate vertical dead-center position; linkage means connected to said second arm for first raising the latter with respect to said first arm, and for then raising both said arms in their thus attained relative position together with said load carrying bucket, said linkage means including a lost motion connection for limiting the extent of free turning movement of said second arm with respect to said first arm sufficient to bring said wall of said bucket from its horizontal position to a downwardly inclined load delivering position; and moving means connected to said linkage means for moving the latter to thus raise said arms.

References Cited in the file of this patent

UNITED STATES PATENTS

| 2,119,139 | Owen et al. | May 31, 1938 |
| 2,531,993 | Smith | Nov. 28, 1950 |
| 2,699,876 | Smith | Jan. 18, 1955 |

FOREIGN PATENTS

| 1,025,035 | France | Apr. 9, 1953 |

OTHER REFERENCES

Holmes-Owen Publication (4 pp.), received U. S. Patent Office Sept. 19, 1952.